United States Patent [19]

Terunuma

[11] Patent Number: 5,660,879
[45] Date of Patent: Aug. 26, 1997

[54] PROCESS FOR PRODUCTION OF A MAGNETIC HEAD

[75] Inventor: Koichi Terunuma, Tokyo, Japan

[73] Assignee: TDK Corporation, Tokyo, Japan

[21] Appl. No.: 438,375

[22] Filed: May 10, 1995

Related U.S. Application Data

[62] Division of Ser. No. 285,530, Aug. 4, 1994, Pat. No. 5,558,944.

[30] Foreign Application Priority Data

Aug. 10, 1993 [JP] Japan ................................ 5-218079

[51] Int. Cl.$^6$ ........................................................ B05D 1/18
[52] U.S. Cl. .................... 427/130; 427/131; 427/132; 427/383.1; 427/404; 427/419.2; 148/101
[58] Field of Search ........................ 427/131, 383.1, 427/132, 404, 130, 419.2, 245

*Primary Examiner*—Bernard Pianalto
*Attorney, Agent, or Firm*—Oblon, Spivak, McClelland, Maier & Neustadt, P.C.

[57] ABSTRACT

The improved metal-in-gap magnetic head has a thin ferromagnetic metal film and a gap film superposed on an oxide substrate in that order and an intermediate film made of a nonmagnetic metal or a semiconductor is formed either in the space between the oxide substrate and the ferromagnetic film or between the ferromagnetic film and the gap film or in both spaces and then heat treated to provide such a profile that the element forming the intermediate film is of high concentration at the interface between the ferromagnetic film and the oxide substrate or the gap film whereas said element is of low concentration and distributed in a substantially uniform and continuous manner throughout the interior of the ferromagnetic film.

The ferromagnetic film is formed preferably of an Fe—Al—Si (Sendust) alloy, an Fe—M—N alloy or an Fe—M—C alloy (M=Zr, Ta, Nb, Hf, etc.). The intermediate film which contributes corrosion resistance is made preferably of at least one of Cr, Al and Si, with its concentration being preferably from 50 at % to less than 100 at % at the interface between the ferromagnetic film and the oxide substrate or the gap film but from 0.5 at % to 10 at % within the ferromagnetic film. To insure that the element which forms the intermediate film is distributed uniformly and continuously within the ferromagnetic film, the intermediate film is preferably heat treated at 500° to 700° C. for a period of 5 to 120 min.

11 Claims, 4 Drawing Sheets

PROCESS FOR PRODUCTION OF A MAGNETIC HEAD

This is a division of application Ser. No. 08/285,530, filed on Aug. 4, 1994, U.S. Pat. No. 5,558,944.

BACKGROUND OF THE INVENTION

This invention relates to a magnetic head in which the area around the gap is formed of a thin ferromagnetic metal film, as well as a process for producing said magnetic head. More particularly, the invention relates to a magnetic head characterized by improved corrosion resistance of the thin ferromagnetic metal film.

With a view to providing improved saturated flux density in levitation and other types of magnetic heads, a structure called the metal-in-gap type has heretofore been adopted and this structure is characterized by the attachment of a thin film of a ferromagnetic metal such as Sendust to the gap forming face of a substrate (core) which is formed of a magnetic oxide (e.g., ferrite) or a nonmagnetic oxide. A problem with this approach is that if a thin ferromagnetic metal film is formed on the ferrite by a deposition technique such as sputtering, an undesirably modified layer forms between the oxide in the core and the thin ferromagnetic metal film, causing deterioration in characteristics such as increased magnetic resistance or impaired soft magnetic properties and, what is more, the modified layer may occasionally serve as a pseudo-gap. Another problem with the thin ferromagnetic metal film is that it can potentially cause corrosion during cutting, cleaning and other steps of the fabrication process.

With a view to solving these problems of undesirable modification and corrosion, it has been proposed that a magnetic head of the type shown in FIG. 1A (cross-sectional side view) and FIG. 1B (plan view) in which one of the opposing surfaces of ferrite or otherwise formed substrates 1 and 2 is provided with a thin ferromagnetic metal film 3, with an $SiO_2$ or otherwise formed gap member 4 being inserted between the thin ferromagnetic metal film 3 and the substrate 2 and bonded by means of glass 5 should have a film 6 of nonmagnetic metal such as Cr, Ti or Si that is provided between the thin ferromagnetic metal film 3 and each of the substrates 1 and 2. Alternatively, it has been proposed that a magnetic head of the type shown in FIG. 2A (cross-sectional side view) and FIG. 2B (plan view) in which the thin ferromagnetic metal film 3 is formed on the two opposing surfaces of the substrates 1 and 2 should have a film 6 of nonmagnetic metal such as Cr, Ti or Si that is provided not only between the thin ferromagnetic metal film 3 and each of the substrates 1 and 2 but also between the gap member 4 and each thin ferromagnetic metal film 3. (See Unexamined Published Japanese Patent Application (kokai) Sho 61-172203 or Unexamined Published Japanese Patent Application (kokai) Hei 4-241205) The basic idea behind the provision of the nonmagnetic metal film 6 in those prior art magnetic heads is to insure that the nonmagnetic metal element will not diffuse so much into the thin ferromagnetic metal film 3 as to widen the pseudo-gap between the magnetic layers and, hence, glass of a low-melting point of about 350° to 450° C. is employed to prevent diffusion of that element during fusion of the substrates 1 and 2 by means of glass 5.

However, these conventional magnetic heads have had the problem that it is not always possible to insure satisfactory corrosion resistance for the thin ferromagnetic metal film 3. Stated more specifically, the recent trend in magnetic recording and reproduction to increase the density of recording signals on a magnetic recording/reproducing apparatus has made it necessary that the ferromagnetic film for use in the magnetic head be formed of a material having a higher saturation flux density Bs. Ferromagnetic films for use in magnetic heads are generally made of FeAlSi (Sendust alloys) and NiFe (permalloys) which have saturation flux densities (Bs) on the order of 1 T. Candidates under review for materials having higher saturation flux densities are Fe base microcrystalline films typified by those of Fe—M—N and Fe—M—C (M=Zr, Ta, Nb, Hf, etc.) which have saturation flux densities (Bs) in excess of 1.5 T. However, these materials have the drawback that they contain more Fe than Sendust alloys and permalloys and, hence, are poor in corrosion resistance.

In order to improve the corrosion resistance of the thin ferromagnetic metal film 3, it has been proposed that the formation of the nonmagnetic metal film 6 be replaced by the addition of certain elements to said thin metal film 3. Take, for example, Sendust alloys as ferromagnetic metals; addition elements that are effective include elements of group IVa (Ti, Zr and Hf), elements of group Va (V, Nb and Ta), elements of the platinum group (Ru, Rh, Pd, Os, Ir and Pt), Cr, etc. On the other hand, Cr, Al, Si, etc., have been found to be effective for the Fe-base microcrystalline films.

To add these elements to the thin ferromagnetic metal films, sputtering may be performed using an alloy or composite target that has a predetermined element already added thereto in a predetermined amount. However, the addition of these elements by sputtering will cause segregation and it is difficult to have them distributed uniformly in the thin ferromagnetic metal film. As a result, one often fails to assure the desired corrosion resistance and the production yield is low. If, on the other hand, the addition of those elements is increased with care being taken to prevent segregation while insuring to provide a practical level of corrosion resistance, deterioration in characteristics occurs in one way or another, as exemplified by significant decrease in the saturation flux density Bs of the thin ferromagnetic metal film 3 or the failure to provide high permeability. Thus, it has been difficult to provide improved corrosion resistance while maintaining satisfactory magnetic characteristics.

A further problem concerns adhesion strength and the ferromagnetic film has often separated from the oxide substrate during a machining step such as a cutting operation.

SUMMARY OF THE INVENTION

The present invention has been accomplished under these circumstances and has as an object providing a magnetic head of such a construction that the corrosion resistance of the thin ferromagnetic metal film can be improved by the addition of small amounts of elements.

This object can be attained by a metal-in-gap magnetic head having a thin ferromagnetic metal film and a gap film superposed on an oxide substrate in that order, characterized in that an intermediate film made of a nonmagnetic metal or a semiconductor is formed either in the space between the oxide substrate and the ferromagnetic film or between the ferromagnetic film and the gap film or in both spaces and then heat treated to provide such a profile that the element forming the intermediate film is of high concentration at the interface between the ferromagnetic film and the oxide substrate or the gap film whereas said element is of low concentration and distributed in a substantially uniform and continuous manner throughout the interior of the ferromagnetic film.

In the practice of the invention, the ferromagnetic film is formed preferably of an Fe—Al—Si (Sendust alloy) system, an Ni—Fe (permalloy) system, an Fe—M—N system or an Fe—M—C system (M=Zr, Ta, Nb, Hf, etc.), with its thickness being generally in the range from about 0.2 to 30 μm.

The intermediate film which contributes corrosion resistance is made preferably of at least one of Cr, Al and Si, with its thickness ranging from 30 to 300 Å; the concentration of either one of Cr, Al or Si is preferably from 50 at % to less than 100 at % at the interface between the ferromagnetic film and the oxide substrate or the gap film but may range from 0.5 to 10 at % within the ferromagnetic film.

To insure that the element which forms the intermediate film is distributed uniformly and continuously throughout the interior of the ferromagnetic film, the intermediate film is preferably heat treated at 500° to 700° C. for a period of 5 to 120 min.

By thusly diffusing the intermediate film forming element in the thin ferromagnetic metal film, the element, even if it is added in small amounts that will not impair the magnetic characteristics, can be distributed uniformly throughout the interior of the ferromagnetic metal film without causing segregation, whereby satisfactory corrosion resistance can be achieved.

The magnetic head constructed in accordance with the invention has another advantage in that the element which forms the intermediate film is sufficiently diffused into the ferromagnetic film so that the adhesion strength of the latter is improved over the prior art.

DETAILED DESCRIPTION OF THE PREFERRED EMBODIMENTS

Figure 1A:
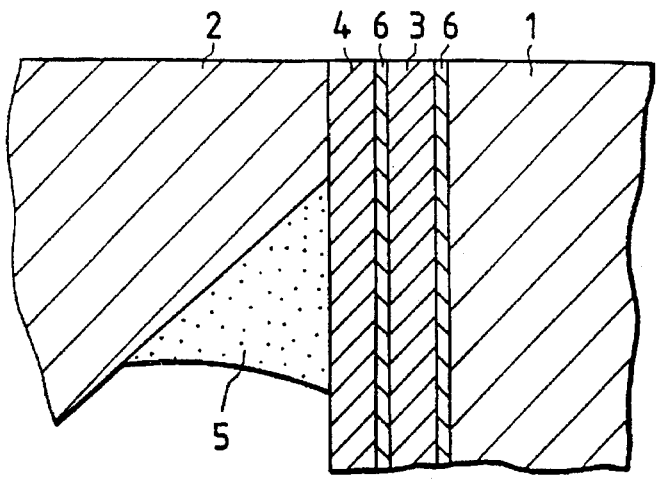
FIG. 1A is a cross-sectional side view showing, in part, a magnetic head.
Figure 1B:
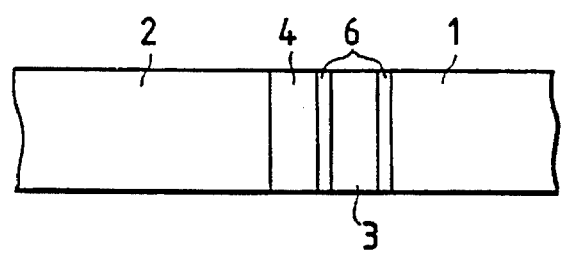
FIG. 1B is a plan view of the head.
Figure 2A:
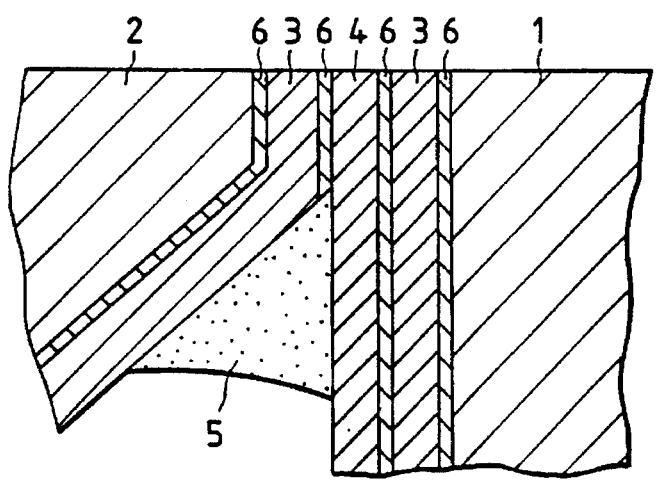
FIG. 2A is a cross-sectional side view showing, in part, another magnetic head.
Figure 2B:
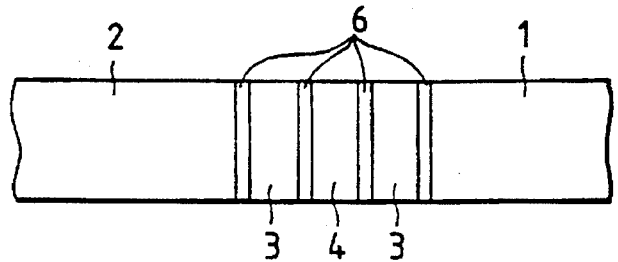
FIG. 2B is a plan view of the head.

Consider two types of magnetic heads, one being shown in FIGS. 1A and 1B, in which one of the opposing surfaces of ferrite or otherwise formed substrates 1 and 2 is provided with a thin ferromagnetic metal film 3, with an $SiO_2$ or otherwise formed gap member 4 being inserted between the thin ferromagnetic metal film 3 and the substrate 2 and bonded by means of glass 5, and the other being shown in FIGS. 2A and 2B, in which the thin ferromagnetic metal film 3 is formed on the two opposing surfaces of the substrates 1 and 2. In the first case, an intermediate layer 6 is formed of Cr, Al, Si or the like and provided between the thin ferromagnetic metal film 3 and each of the substrates 1 and 2. In the second case, the same intermediate layer is provided not only between the thin ferromagnetic metal film 3 and each of the substrates 1 and 2 but also between the gap member 4 and each thin ferromagnetic metal film 3.

After forming the thin ferromagnetic metal films 3 and the intermediate layers 6, heat treatment is conducted at a temperature of 500° to 700° C. for 5 to 120 min either in vacuum ($\leq 10^{-4}$ Pa) or in an inert gas atmosphere (e.g., Ar or $N_2$), so that the element forming the intermediate layers will diffuse into the thin ferromagnetic metal films. The heat treatment may be performed in the absence or presence of an applied magnetic field and if a magnetic field is to be applied, it may be static or rotating.

The thin ferromagnetic metal films 3 may be those of FeAlSi (Sendust alloys), NiFe (permalloys) or Fe-base microcrystalline alloys such as Fe—M—N and Fe—M—C (M=Zr, Ta, Nb, Hf, etc.) and their thickness ranges typically from 0.2 to 30 μm, desirably from 2 to 3 μm.

The intermediate layers 6 are formed of Cr, Al or Si that have comparatively large diffusion coefficients and which hence can be distributed uniformly throughout the ferromagnetic metal films 3. The thickness of the intermediate layers ranges typically from 30 to 300 Å, desirably from 50 to 100 Å. To compose the intermediate layers, Cr, Al and Si may be used either individually or in admixtures; however, if any one of Cr, Al and Si is used as a constituent element in the thin ferromagnetic metal films 3, such element should be excluded from the list of elements that can be used to form the intermediate layers. For instance, if the thin ferromagnetic metal films 3 are made of FeAlSi (Sendust alloys), Cr is the only element that can be used to form the intermediate layers. The upper and lower intermediate layers need not be made of the same element.

The thin ferromagnetic metal films 3 and the intermediate layers 6 may be formed of any deposition technique that is selected from among sputtering (which may be RF sputtering, DC sputtering, conventional sputtering or magnetron sputtering), ion-beam sputtering, vacuum evaporation and plating. If sputtering techniques are to be used, the films may be formed using an Ar-base gas at pressures in the range from about 0.1 to 5 Pa with an input power of 0.1 to 10 W/cm². The substrates may be water-cooled or heated depending on the metal from which the films are to be formed.

A three-layer film consisting of Cr (80 Å)/$Fe_{82}Zr_9N_9$ (2 μm)/Cr (250 Å) in the parenthesized thicknesses was formed on an Mn—Zn polycrystalline ferrite substrate by RF magnetron sputtering. The sputtering conditions were as listed below in Table 1.

TABLE 1

|  | Fe—Zr—N film | Cr film |
|---|---|---|
| Target | Fe-14 at % Zr | Cr |
| Input power | 2.8 W/cm$^2$ | 1.7 W/cm$^2$ |
| Gas pressure | Ar + 10% N$_2$ 0.4 Pa | Ar 0.67 Pa |

Figure 4:
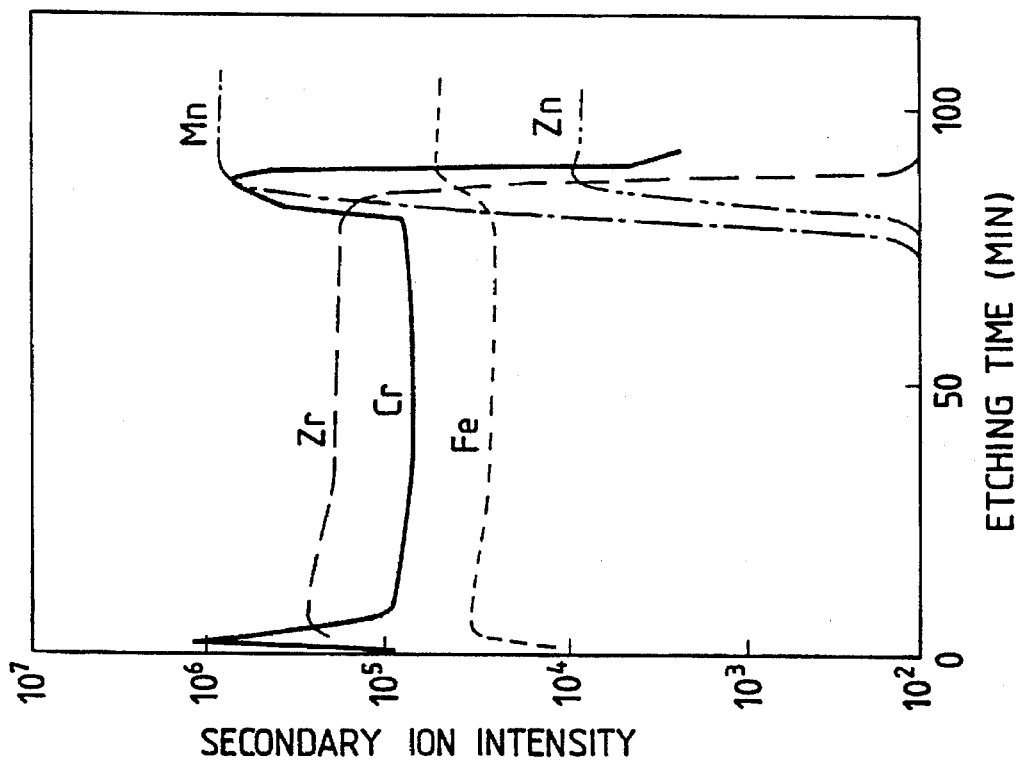
FIG. 4 shows SIMS profiles in depth direction for a nonmagnetic metal film that was formed in accordance with the invention and which was thereafter subjected to a heat treatment under vacuum for 30 min at 600° C.
Figure 3:
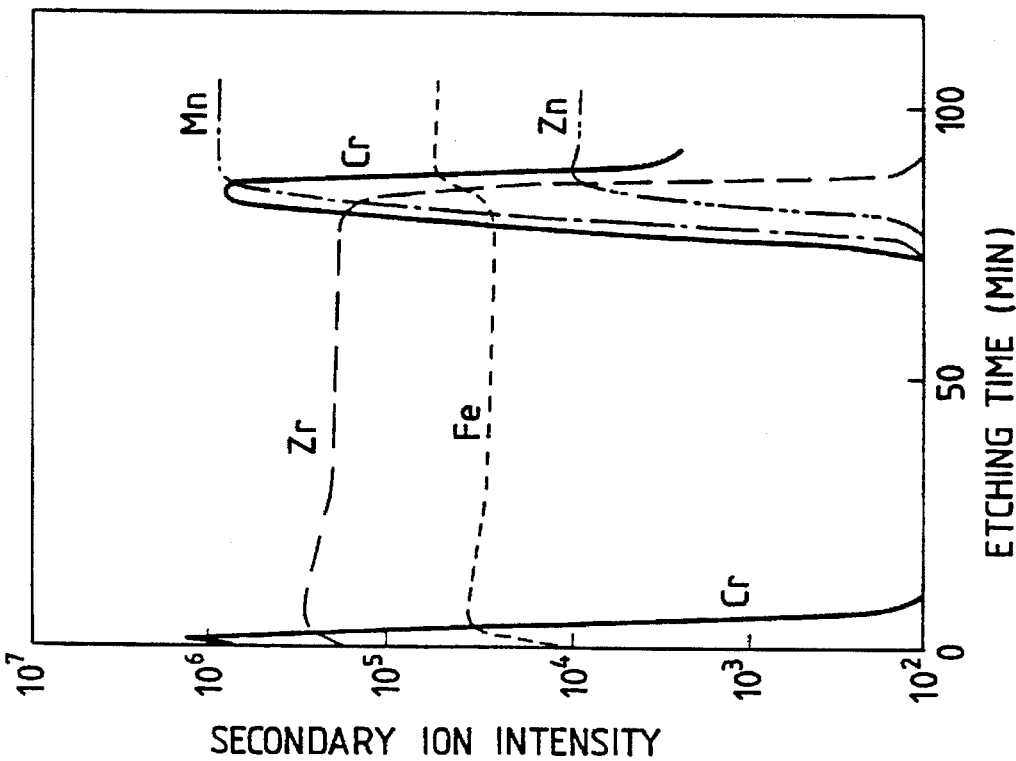
FIG. 3 shows SIMS profiles in depth direction for a nonmagnetic metal film that was not subjected to any subsequent heat treatment.

Two samples were prepared and one of them was not subjected to any subsequent treatment whereas the other was subjected to a subsequent heat treatment at 600° C. for 30 min in vacuum ($\leq 10^{-4}$ Pa). The two samples were thereafter examined by SIMS (secondary ion mass spectroscopy) and the respective profiles obtained in thickness direction are shown in FIGS. 3 and 4. As is clear from FIG. 3, the untreated sample was substantially devoid of Cr in the interior of the thin ferromagnetic metal film and the SIMS profile in FIG. 4 shows that the heat treatment caused Cr to diffuse uniformly into the thin ferromagnetic metal film.

Figure 5:
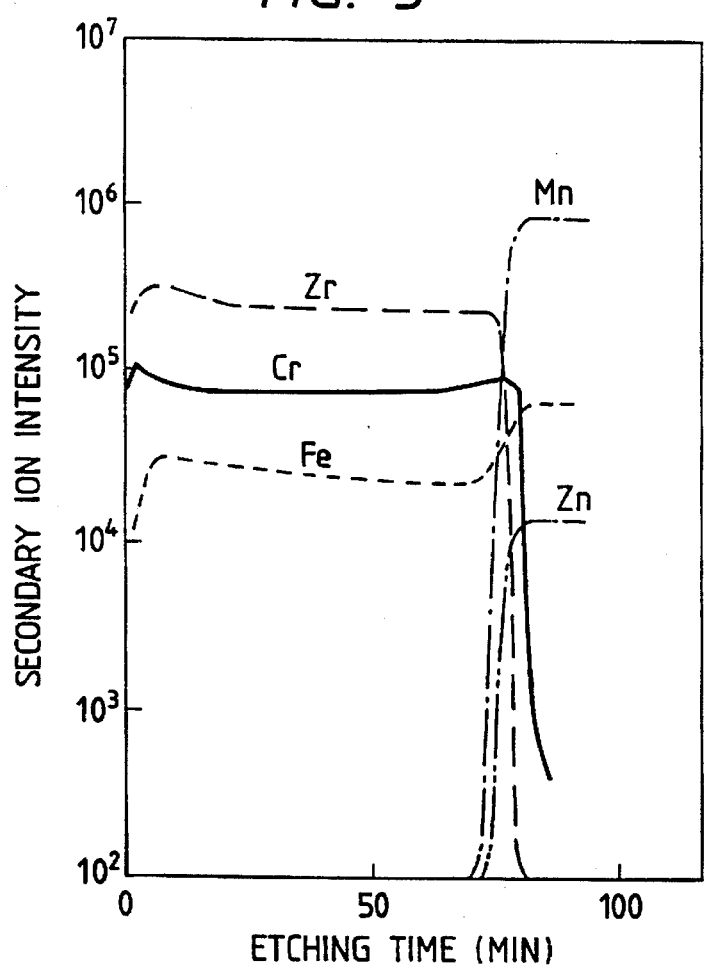
FIG. 5 shows SIMS profiles in depth direction for a thin ferromagnetic metal film which, after the addition of a nonmagnetic element, was subjected to a heat treatment under vacuum for 30 min at 600° C.

For comparison, Cr was added during the formation of an Fe—Zn—N film. Using a composite target consisting of an Fe—Zr target having a Cr chip attached thereto, sputtering was conducted under the same conditions as described above to have a film of $Fe_{80}Zr_8Cr_4N_8$ deposited in a thickness of 2 μm on an Mn—Fe polycrystalline substrate. After subsequent heat treatment in vacuum at 600° C. for 30 min, an SIMS profile was taken in thickness direction. The result is shown in FIG. 5, from which one can see that Cr was distributed uniformly across the thickness of the thin ferromagnetic film without any pronounced peak on either the observe or reverse side of the film.

In the next experiment, Al was used as an element to form the intermediate film. The following three layer arrangements were provided on glass ceramics:

A: Al (100 Å)/$Fe_{82}Zr_9N_9$ (2 μm)/Al (100 Å)

B: $Fe_{80}Zr_8Al_4N_8$ (2 μm)

C: $Fe_{82}Zr_9N_9$ (2 μm)

The samples were then heat treated at 600° C. for 60 min in vacuum ($\leq 10^{-4}$ Pa). For comparison in terms of corrosion resistance, those samples were stored in a hot and humid atmosphere (60° C.×95%) and the relative changes in saturation flux density and any changes that occurred after 250 hours in the surface and across the thickness was checked. The results are shown in Table 2 below.

TABLE 2

|  |  |  |  |  |  | Color change | |
|---|---|---|---|---|---|---|---|
| Initial | 50 h | 100 h | 150 h | 200 h | 250 h | Surface | Across thickness |
| A 1.000 | 0.990 | 0.987 | 0.985 | 0.984 | 0.982 | "A" | "A" |
| B 1.000 | 0.990 | 0.870 | 0.854 | 0.829 | 0.813 | "B" | "B" |
| C 1.000 | 0.865 | 0.805 | 0.773 | 0.754 | 0.721 | "C" | "C" |

A: no change; B: partial change; C: extensive change

As one can see from Table 2, sample B which contained aluminum in the thin ferromagnetic metal film experienced less drop in saturation flux density than Al-free sample C and did not undergo any color change even when it was stored in a hot and humid atmosphere. This demonstrates the superiority of sample B in terms of corrosion resistance and the retention of characteristics. Table 2 also shows that sample A which was subjected to heat treatment after forming an Al film on both sides of the thin ferromagnetic metal film was even better than sample B in terms of both protection against the decrease in saturation flux density and resistance to corrosion.

To evaluate the use of Cr as an element to form the intermediate film 6, the following three additional samples D to F were prepared and subsequently heat treated at 600° C. in vacuum for 60 min. The samples were then subjected to a corrosion test as above. The test results are shown in Table 3.

D: Cr (100 Å)/$Fe_{74}Al_9Si_{17}$ (2 μm)/ Cr (100 Å)

E: $Fe_{74}Al_{8.5}Si_{16.5}Cr_{1.0}$ (2 μm)

F: $Fe_{74}Al_9Si_{17}$ (2 μm)

TABLE 3

|  |  |  |  |  |  | Color change | |
|---|---|---|---|---|---|---|---|
| Initial | 50 h | 100 h | 150 h | 200 h | 250 h | Surface | Across thickness |
| D 1.000 | 0.997 | 0.995 | 0.993 | 0.992 | 0.988 | "A" | "A" |
| E 1.000 | 0.948 | 0.934 | 0.922 | 0.915 | 0.900 | "B" | "A" |
| F 1.000 | 0.913 | 0.895 | 0.889 | 0.881 | 0.870 | "C" | "C" |

It is clear from Table 3 that as in the case of Al, sample E which incorporated Cr in the thin ferromagnetic metal film experienced less drop in saturation flux density than Cr-free sample E. Sample D which had a Cr film formed on both sides of the thin ferromagnetic metal film was even better than sample E in terms of protection against lower saturation flux density and color change.

In the next experiment, Si was used as an element to form the intermediate film. The following three additional samples G to I were prepared, heat treated and subjected to a corrosion test. The test results are shown in Table 4.

G: Si (100 Å)/$Fe_{75}Zr_{10}C_{12}$ (2 μm)/ Si (100 Å)

H: $Fe_{75}Zr_{10}Si_3C_{12}$ (2 μm)

I: $Fe_{78}Zr_{10}C_{12}$ (2 μm)

TABLE 4

|  |  |  |  |  |  | Color change | |
|---|---|---|---|---|---|---|---|
| Initial | 50 h | 100 h | 150 h | 200 h | 250 h | Surface | Across thickness |
| G 1.000 | 0.992 | 0.990 | 0.987 | 0.985 | 0.984 | "A" | "A" |
| H 1.000 | 0.907 | 0.851 | 0.806 | 0.795 | 0.780 | "B" | "B" |
| I 1.000 | 0.854 | 0.800 | 0.765 | 0.731 | 0.700 | "C" | "C" |

In the next experiment, Cr and al were used in combination as elements to form the intermediate film. The following two additional samples J and K were prepared, heat treated and subjected to a corrosion test. The test results are shown in Table 5.

J: Cr (100 Å)/$Fe_{82}Zr_9N_9$ (2 μm)/Al (100 Å)

K: $Fe_{78}Zr_9Cr_2Al_2N_9$ (2 μm)

C: $Fe_{82}Zr_9N_9$ (2 μm)

TABLE 5

|  |  |  |  |  |  | Color change | |
|---|---|---|---|---|---|---|---|
| Initial | 50 h | 100 h | 150 h | 200 h | 250 h | Surface | Across thickness |
| J 1.000 | 0.995 | 0.992 | 0.989 | 0.986 | 0.985 | "A" | "A" |
| K 1.000 | 0.910 | 0.858 | 0.812 | 0.793 | 0.784 | "B" | "B" |
| C 1.000 | 0.865 | 0.805 | 0.773 | 0.754 | 0.721 | "C" | "C" |

In the next experiment, Al and Si were used in combination as elements to form the intermediate film. The following two additional samples L and M were prepared, heat treated and subjected to a corrosion test. The test results are shown in Table 6.

L: Al (100 Å)/$Fe_{82}Zr_9N_9$ (2 μm)/ Si (100 Å)

M: $Fe_{78}Zr_9Al_2Si_2N_9$ (2 μm)

C: $Fe_{82}Zr_9N_9$ (2 μm)

TABLE 6

|   | Initial | 50 h | 100 h | 150 h | 200 h | 250 h | Color change Surface | Color change Across thickness |
| --- | --- | --- | --- | --- | --- | --- | --- | --- |
| L | 1.000 | 0.995 | 0.994 | 0.992 | 0.990 | 0.989 | "A" | "A" |
| M | 1.000 | 0.913 | 0.862 | 0.829 | 0.818 | 0.801 | "B" | "B" |
| C | 1.000 | 0.865 | 0.805 | 0.773 | 0.754 | 0.721 | "C" | "C" |

In the next experiment, Cr and Si were used in combination as elements to form the intermediate film. The following two additional samples were prepared, heat treated and subjected to a corrosion test. The test results are shown in Table 7.

N: Cr (100 Å)/$Fe_{78}Zr_{10}C_{12}$ (2 μm)/ Si (100 Å)

O: $Fe_{76}Zr_{10}Cr_2Si_2C_{12}$ (2 μm)

I: $Fe_{78}Zr_{10}C_{12}$ (2 μm)

TABLE 7

|   | Initial | 50 h | 100 h | 150 h | 200 h | 250 h | Color change Surface | Color change Across thickness |
| --- | --- | --- | --- | --- | --- | --- | --- | --- |
| N | 1.000 | 0.993 | 0.990 | 0.988 | 0.986 | 0.984 | "A" | "A" |
| O | 1.000 | 0.909 | 0.852 | 0.822 | 0.800 | 0.795 | "B" | "B" |
| I | 1.000 | 0.854 | 0.800 | 0.765 | 0.731 | 0.700 | "C" | "C" |

Obviously, the results obtained when the intermediate film was formed of Cr—Al, Al—Si, Si—Cr or Cr—Al—Si alloy were similar to those obtained when Cr, Al or Si was used as the sole element to form the intermediate film.

An experiment was also conducted using Cr as an element to form the intermediate film, with the thin ferromagnetic metal film being formed from a Sendust alloy in a thickness of 2 μm, and the relationship between the diffusion of Cr and corrosion resistance or magnetic characteristics was investigated. For comparison, the case of adding Cr in alloy form was tested.

Laminated films were prepared on glass ceramics (10 mm×10 mm) in accordance with the invention under the same conditions as set forth in Table 1, forming the ferromagnetic film of $Fe_{82}Zr_9N_9$ in a thickness of 2 μm and the intermediate film of Cr. The concentration of Cr in the ferromagnetic film was controlled by adjusting the thickness of the Cr film and the conditions for the heat treatment performed on the laminated films. As the comparison, a single-layered FeZrCrN film 2 μm thick was prepared under the same conditions using a composite target that was made by attaching Cr chips to an Fe—Zr target. The concentration of Cr was controlled by adjusting the number of Cr chips attached to the target. For comparison of corrosion resistance, the samples were stored in a hot and humid atmosphere (60° C.×95%) for 250 hours and the resulting relative changes in saturation flux density were checked. The changes in magnetic characteristics with the Cr concentration were also checked by measuring the initial value of permeability at 5 MHz before the samples were subjected to the endurance test. Permeability measurements were conducted by the 8-figure coil method in an applied magnetic field of 5 mOe. The results of measurements are shown in Table 8 below.

TABLE 8

| Concentration (at %) of Cr in the ferromagnetic film | Invention Bs (250 h)/ Bs (0) | Invention μ 5 MHz | Comparison Bs (250 h)/ Bs (0) | Comparison μ 5 MHz |
| --- | --- | --- | --- | --- |
| 0.1 | 0.728 | 3,500 | 0.728 | 3.500 |
| 0.5 | 0.903 | 3,600 | 0.735 | 3,500 |
| 1.0 | 0.938 | 3,300 | 0.744 | 3,300 |
| 2.5 | 0.958 | 3,200 | 0.772 | 3,300 |
| 5.0 | 0.990 | 3,200 | 0.815 | 3,200 |
| 7.5 | 0.995 | 2,500 | 0.881 | 2,600 |
| 10.0 | 0.998 | 2,200 | 0.890 | 2,000 |
| 12.5 | 0.998 | 1,500 | 0.902 | 1,400 |
| 15.0 | 0.998 | 1,000 | 0.916 | 900 |

As one can see from Table 8, the laminated film samples of the invention experienced no more than 10% loss in saturation flux density when the Cr concentration of the ferromagnetic film was at least 0.5 at %; however, to achieve the same result in the comparative samples (Cr added as alloy), the Cr concentration had to be at least 10 at %. The drop in saturation flux density was due to deterioration of the ferromagnetic film and the smaller the drop, the higher the corrosion resistance of the film. On the other hand, the permeability characteristic deteriorated at Cr concentrations in excess of 10 at %. Hence, satisfactory corrosion resistance is assured if the concentration of Cr (or Al or Si) in the ferromagnetic film is at least 0.5 at % but its magnetic characteristics deteriorate if the Cr concentration exceeds 10 at %. If Cr is to be added in the form of an alloy as in the comparative samples, it cannot be incorporated uniformly unless its concentration is at least ten-odd atomic percent; however, if Cr is to be diffused by conducting a heat treatment in accordance with the invention, it can be distributed uniformly even if its concentration is no more than 10 at %. Based on these observations, one can conclude that in accordance with the invention, thin ferromagnetic metal films that are satisfactory in terms of both corrosion resistance and magnetic characteristics can be formed by adjusting the concentration of Cr (or Al or Si) in the ferromagnetic film to lie in the range from 0.5 to 10 at %, preferably 1.0 to 10 at %, more preferably 2.5 to 10 at %.

Another experiment was conducted with the nonmagnetic metal film being formed of Cr. In this experiment, the concentration of a nonmagnetic element Cr at the interface between the substrate and the intermediate film was varied to evaluate the peel strength of the intermediate film from the substrate. The substrate was a polycrystalline Mn—Zn substrate, on which a Cr film and an $Fe_{82}Zr_9N_9$ (2 μm) film were deposited in superposition. The interfacial Cr concentration was adjusted by varying the thickness of the Cr film. The samples were then subjected to a heat treatment that was conducted at 600° C. in vacuo for 60 min. A comparative sample was prepared without forming the Cr intermediate layer. The results of the peel test conducted on the samples are shown in Table 9 below.

TABLE 9

| Interfacial Cr concentration (at %) | Peel strength (in relative values) |
| --- | --- |
| ≧90 | 2.1 |
| 80–90 | 1.9 |
| 70–80 | 1.8 |
| 60–70 | 1.7 |
| 50–60 | 1.6 |

TABLE 9-continued

| Interfacial Cr concentration (at %) | Peel strength (in relative values) |
|---|---|
| <50 | 1.5 |
| 0 (comparison) | 1.0 |

Peel strength measurements were conducted by a scratch test and the results were evaluated in terms of relative values, with the value for the comparative sample taken as unity. When the interfacial Cr concentration was at least 50 at %, the samples exhibited peel strength values at least 1.5 times as high as the value for the comparative sample. To maintain such high Cr levels, the thickness of the intermediate film is adjusted to lie preferably in the range from 30 to 200 Å, more preferably from 50 to 100 Å, assuming a thin ferromagnetic metal film 2 to 3 µm thick. The intermediate film having this range of thickness is also effective in preventing the generation of a pseudo-gap.

Figure 6:
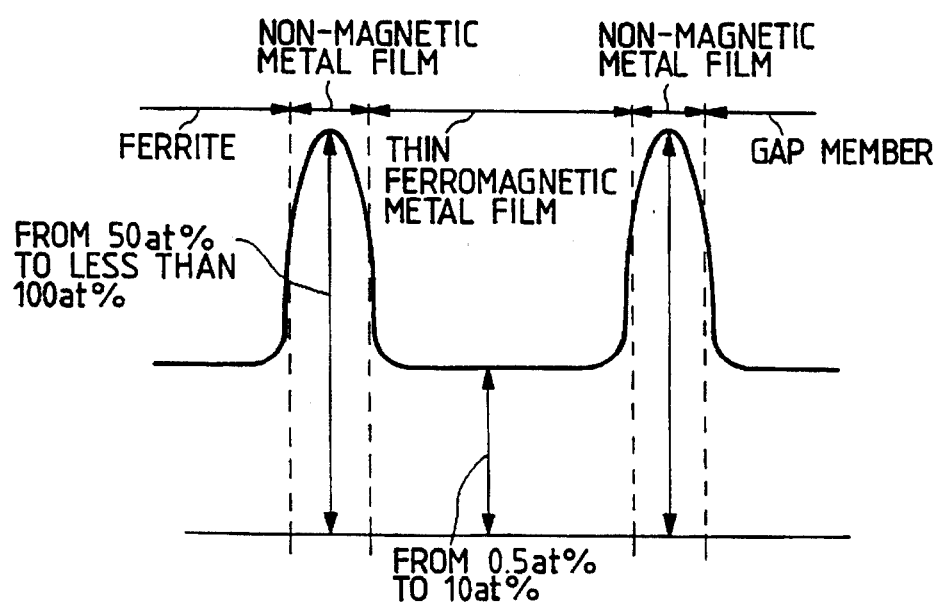
FIG. 6 shows schematically the distribution of an element in the nonmagnetic metal film in the magnetic head constructed in accordance with the invention.

The heat treatment in accordance with the invention may be performed after the formation of the gap shown in FIGS. 1A and 2A or it may be conducted while the substrates 1 and 2 are fused together by means of glass 5. FIG. 6 shows schematically how the element forming the intermediate layer is distributed in the magnetic head produced by the invention.

Figure 8:
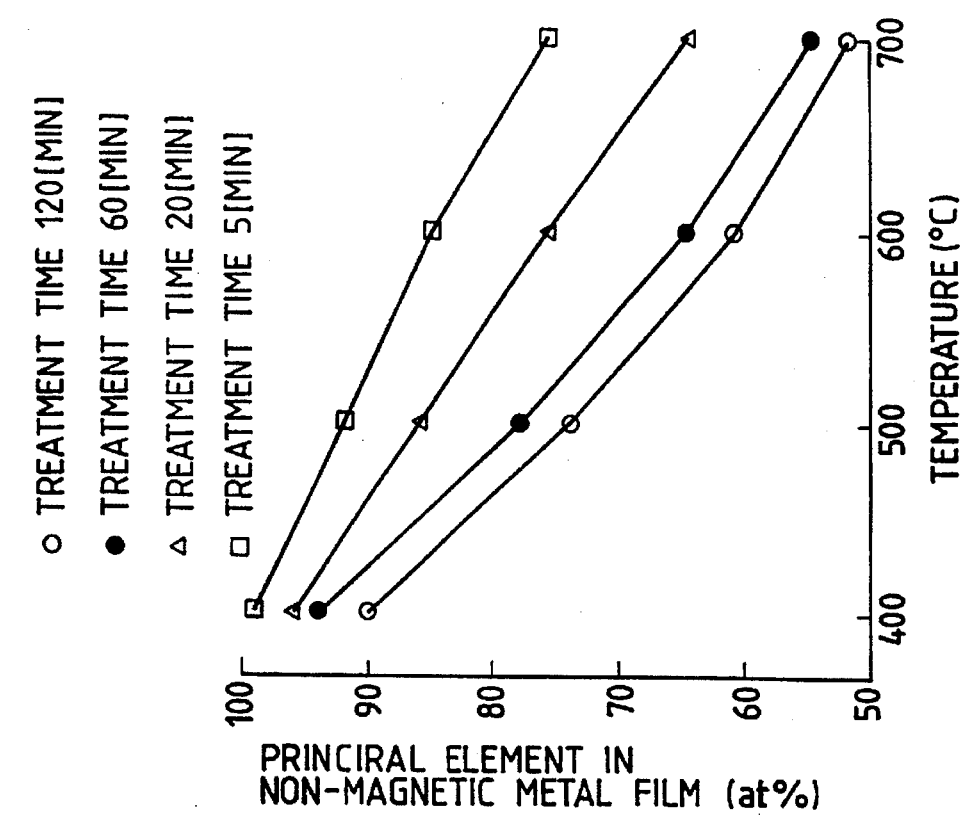
FIG. 8 is a graph showing the relationship between the temperature for heat treatment conducted in the present invention and the concentration of a nonmagnetic element in the nonmagnetic metal film, with the time of heat treatment being taken as a parameter.
Figure 7:
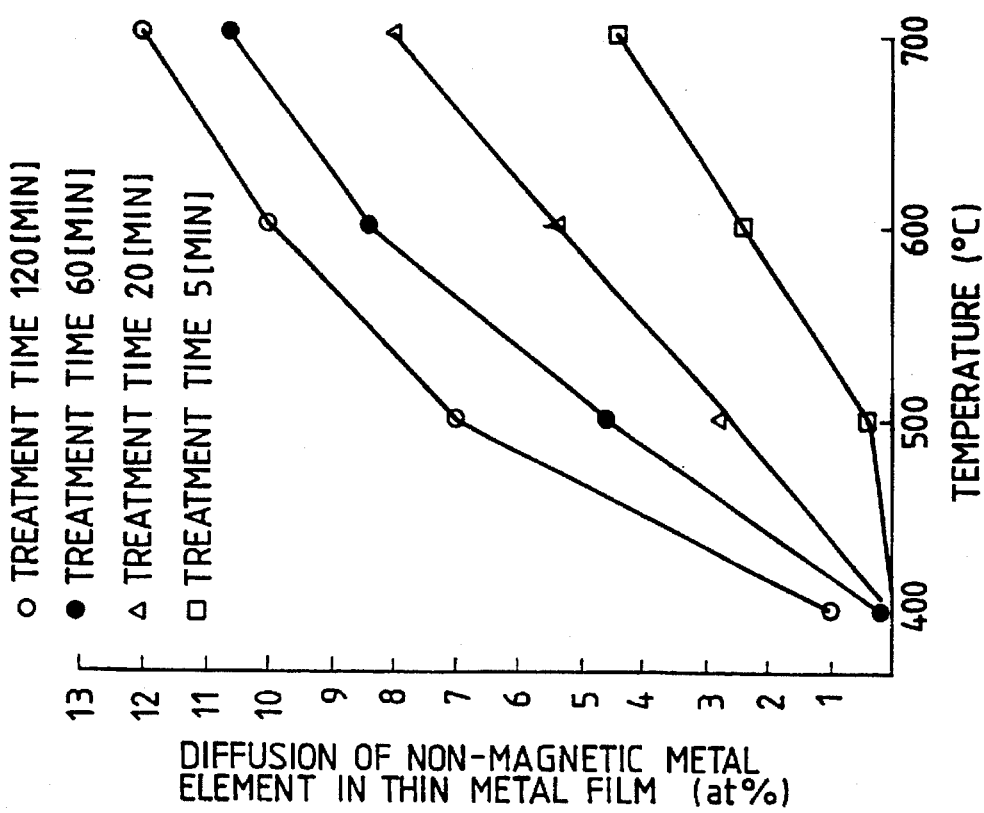
FIG. 7 is a graph showing the relationship between the temperature for heat treatment conducted in the present invention and the concentration of a nonmagnetic element in the thin ferromagnetic film, with the time of heat treatment being taken as a parameter.

FIG. 7 is a graph showing how the concentration of Cr in a thin ferromagnetic Sendust film (2 µm thick) changed with the temperature for heat treatment (400°–700° C.) at four varying treatment times in the case where the intermediate layer was formed of Cr in a thickness of 100 Å. FIG. 8 is a similar graph except that it shows the changes of the concentration of Cr in the nonmagnetic metal film. In order to insure that the concentrations of Cr in the thin ferromagnetic metal film and in the nonmagnetic film are held within the ranges specified herein and to minimize the period of heat treatment while preventing the deterioration of magnetic characteristics, the temperature for the heat treatment is adjusted to be preferably within the range from 500° to 700° C. whereas the period of the treatment is adjusted to lie preferably within the range from 5 to 120 min.

As described on the foregoing pages, heat treatment is conducted in the invention in order to insure that the trace elements for providing improved corrosion resistance are diffused within the thin ferromagnetic metal film and, as a result, those elements are diffused uniformly without causing segregation, whereby the corrosion resistance of the film can be improved and yet its magnetic characteristics are not impaired. As a further advantage, the peel strength of the thin ferromagnetic metal film adhering to the substrate can be enhanced satisfactorily.

What is claimed is:

1. A process comprising the steps of:
   forming an intermediate film comprising a non-magnetic metal or a semiconductor element (a) between an oxide substrate and a ferromagnetic film, (b) between a ferromagnetic film and a gap film, or both (a) and (b), to form at least one intermediate film-ferromagnetic film interface;
   heating said intermediate film at a temperature sufficient to diffuse said non-magnetic metal or semiconductor element into said ferromagnetic film forming a concentration of said non-magnetic metal or semiconductor element at said intermediate film-ferromagnetic film interface which is higher than the concentration of said non-magnetic metal or semiconductor element at the interior of said ferromagnetic film and a concentration of said nonmagnetic metal or semiconductor element distributed in a substantially uniform and continuous manner throughout the interior of said ferromagnetic film which is lower than the concentration of said non-magnetic metal or semiconductor element at said intermediate film-ferromagnetic film interface.

2. The process of claim 1, wherein said intermediate film is formed both between said oxide substrate and said ferromagnetic film and between said ferromagnetic film and said gap film.

3. The process of claim 1, wherein said heating is performed at a temperature of 500°–700° C.

4. The process of claim 3, wherein said heating is performed for a period of 5–120 minutes.

5. The process of claim 1, wherein said intermediate film comprises a non-magnetic metal.

6. The process of claim 5, wherein said non-magnetic metal is selected from the group consisting of Cr, Al, Si and alloys thereof.

7. The process of claim 1, wherein said intermediate film comprises a semiconductor element.

8. The process of claim 1, wherein said intermediate film has a thickness of 30–300 angstroms.

9. The process of claim 1, wherein said ferromagnetic film has a thickness of 0.2 to 30 microns.

10. A process, comprising the steps of:
    forming an intermediate film comprising a non-magnetic metal (a) between an oxide substrate and a ferromagnetic film and (b) between said ferromagnetic film and a gap film to form intermediate film-ferromagnetic film interfaces;
    heating said intermediate film at a temperature sufficient to diffuse said non-magnetic metal into said ferromagnetic film wherein said heating forms a concentration of said non-magnetic metal of at least 50 at % but less than 100 at % at said intermediate film-ferromagnetic film interfaces and a concentration of said non-magnetic metal of from 0.5 at % up to 10 at % at the interior of said ferromagnetic film.

11. A process, comprising the steps of:
    forming an intermediate film comprising a non-magnetic metal (a) between an oxide substrate and a ferromagnetic film, (b) between a ferromagnetic film and a gap film, or both (a) and (b), to form at least one intermediate film-ferromagnetic film interface;
    heating said intermediate film at a temperature sufficient to diffuse said non-magnetic metal into said ferromagnetic film, wherein said heating forms a concentration of said non-magnetic metal of at least 50 at % but less than 100 at % at said intermediate film-ferromagnetic film interface and a concentration of said non-magnetic metal of from 0.5 at % up to 10 at % at the interior of said ferromagnetic film.

* * * * *